United States Patent [19]

Klier et al.

[11] Patent Number: 5,281,468
[45] Date of Patent: Jan. 25, 1994

[54] PROCESS FOR THE PREPARATION OF A MULTILAYER PROTECTIVE AND/OR DECORATIVE COATING

[75] Inventors: Konrad Klier, The Hague, Netherlands; Hans-Joachim Streitberger, Birmingham, Mich.

[73] Assignee: BASF Lacke + Farben Aktiengesellschaft, Munster, Fed. Rep. of Germany

[21] Appl. No.: 862,579

[22] PCT Filed: Dec. 12, 1990

[86] PCT No.: PCT/EP90/02256

§ 371 Date: Jul. 21, 1992

§ 102(e) Date: Jul. 21, 1992

[87] PCT Pub. No.: WO91/09686

PCT Pub. Date: Jul. 11, 1991

[30] Foreign Application Priority Data

Dec. 23, 1989 [DE] Fed. Rep. of Germany ....... 3942803

[51] Int. Cl.$^5$ .............................................. B05D 7/14
[52] U.S. Cl. ...................................... 428/209; 428/204; 428/447; 427/409; 427/412.1; 427/419.7; 427/419.8
[58] Field of Search .................. 427/407.1, 409, 419.7, 427/419.8; 428/209, 204, 447

[56] References Cited

U.S. PATENT DOCUMENTS

| | | | |
|---|---|---|---|
| 4,558,090 | 12/1985 | Drexler et al. | 427/407.1 |
| 4,719,132 | 1/1988 | Porter, Jr. | 427/409 |
| 4,791,168 | 12/1988 | Salatin et al. | 427/409 |
| 4,977,207 | 12/1990 | Hoefer et al. | 524/839 |
| 4,978,708 | 12/1990 | Fowler et al. | 427/407.1 |
| 5,130,167 | 7/1992 | Mitsuji et al. | 427/419.8 |

FOREIGN PATENT DOCUMENTS 1290089 1/1991 Canada .
0075957 4/1983 European Pat. Off. .
8802010 3/1988 World Int. Prop. O. .

Primary Examiner—Shrive Beck
Assistant Examiner—Erma Cameron
Attorney, Agent, or Firm—Frank G. Werner; Paul L. Marshall

[57] ABSTRACT

The present invention relates to a process in which
1. a water-dilutable basecoat composition is applied which contains at least one water-dilutable binder, metallic pigments, if desired color pigments, if desired conventional auxiliaries and additives and up to 20% by weight of organic solvents,
2. a polymer film is formed from this basecoat composition,
3. a transparent topcoat containing a polymer containing silyl groups and obtainable by copolymerization of p1 p$_1$) 0.1 to 40% by weight of ethylenically unsaturated silane monomers of the general formula

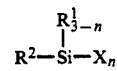

where
R$^1$ is alkyl, aryl, acyl, aralkyl having 1 to 10 carbon atoms
R$^2$ is an organic radical having a polymerizable double bond
X is a hydrolyzable group
n is 1, 2 or 3
p$_2$) 5 to 30 % by weight, preferably 8 to 25% by weight, of monomers having at least 2 polymerizable ethylenically unsaturated double bonds and
p$_3$) 30 to 90% by weight of ethylenically unsaturated monomers without groups having active hydrogen, is applied to this base layer
4. and the top layer is cured together with the base layer.

9 Claims, No Drawings

PROCESS FOR THE PREPARATION OF A MULTILAYER PROTECTIVE AND/OR DECORATIVE COATING

The invention relates to a process for the preparation of a multilayer protective and/or decorative coating on a substrate surface.

In particular in automotive coating, but also in other areas in which coatings having a good decorative effect and, at the same time, good corrosion protection are desired, it is known to provide substrates with several coating layers on top of each other.

Multilayer coatings in which the substrate is first coated with a pigmented basecoat and then a clearcoat is applied have achieved great importance. The preferred procedure is a wet-in-wet process in which the basecoat is coated with the clearcoat after a short flash-off time without a baking step and basecoat and clearcoat are then cured together.

U.S. Pat Nos. 4,499,150 and 4,499,151 disclose basecoat/clearcoat systems in which either the basecoat, the clearcoat or both basecoat and clearcoat contain polyaddition products having alkoxy- or acryloxysilane units.

These polymers containing silane groups are prepared by copolymerization of silicon-free monomers having at least one double bond and ethylenically unsaturated monomers containing silane groups. Not only the basecoat but also the clearcoat are conventional coats, i.e. they are formulated on the basis of organic solvents.

The international patent application published under the number WO 88/02,010 discloses basecoat/clearcoat systems in which either the basecoat, clearcoat or both the basecoat and clearcoat contain polyaddition products having alkoxy- or acryloxysilane units. Not only the basecoat but also the clearcoat are conventional coats. The coatings thus obtained are distinguished in particular by very good stability to gasoline and short drying times. However, the disadvantage of these systems is the pollution of the environment by the solvents when the paint films are dried. Moreover, it is desired to further improve the Erichsen indentation and cross hatch values and the stone-chip resistance of the resulting coatings.

Furthermore, economic and ecological reasons have resulted in the attempt to use aqueous basecoat compositions when multilayer coats are prepared. Aqueous basecoat compositions of this type are described, for example, in German Offenlegungsschrift 3,545,618, U.S. Pat. No. 4,558,090, U.S. Pat. No. 4,489,135, EP-A 89,497 and German Offenlegungsschrift 3,739,332. Conventional solvent-containing, water-dilutable coatings or powder clearcoats are used as topcoat. Typical clearcoats are solvent-containing, acid-curing clearcoats based on amino resins and hydroxyl-containing acrylate copolymers or hydroxyl-containing polyester resins. However, clearcoats of this type require increased baking temperatures and are therefore not suitable for the automotive repair coating field. Therefore, in the automotive repair coating field, clearcoats based on hydroxyl-containing acrylates and blocked isocyanates are used in most cases. However, toxicological and allergy-related aspects are shifting the interest to isocyanate-free automotive repair coatings.

Accordingly, the object of the present invention was to provide a process for the preparation of a multilayer coating in which the pollution of the environment by the solvent when the paint films are dried is minimal. Furthermore, the resulting coatings should have in particular good adhesion, i.e. good Erichsen indentation and cross hatch values and good stone-chip resistance. However, the remaining technical properties, such as gloss, overcoating characteristics and the like should be on a very high level, i.e. comparable with the values obtained when conventional solvent-containing basecoat compositions are used. Finally, the process in question should also be suitable for the automotive repair coating field, i.e. not only the basecoat composition but also the topcoat composition used in the process should be curable at fairly low temperatures of in general below 100° C., preferably below 80° C. The process should of course also be usable, for example, for assembly line coating, i.e. curing conditions of >100° C.

Surprisingly, this object is achieved by a process for the preparation of a multilayer protective and/or decorative coating on a substrate surface in which 1. a water-dilutable basecoat composition is applied, which composition contains
   a) at least one water-dilutable binder selected from the group comprising water-dilutable polyesters, polyurethanes, acrylate copolymers, amino resins, phenolic resins, emulsion polymers,
   b) metallic pigments and, if desired, color pigments and, if desired, fillers,
   c) if desired, customary auxiliaries and additives and
   d) up to 20% by weight of organic solvents,
2. a polymer film is formed on the surface from the composition applied in step (1),
3. a transparent topcoat is applied to the base layer thus obtained, which topcoat contains a polymer containing silyl groups, the polymer being obtainable by copolymerization of
   p₁) 0.1 to 40% by weight of ethylenically unsaturated silane monomers of the general formula (I)

where
R¹ is alkyl, aryl, acyl, aralkyl having 1 to 10 carbon atoms
R² is an organic radical having a polymerizable double bond
X is a hydrolyzable group
n is 1, 2 or 3
p₂) 5 to 30% by weight, preferably 8 to 25% by weight, of monomers having at least 2 polymerizable ethylenically unsaturated double bonds and
p₃) 30 to 90% by weight of ethylenically unsaturated monomers without groups having active hydrogen, the sum of the relative weights of components p₁ to p₃ being in each case 100% by weight,
4. the top layer is cured together with the base layer.

The present invention also relates to the articles coated by this process.

It is surprising and was not foreseeable that the coatings obtained by the process according to the invention would have improved adhesion, i.e. very good Erichsen indentation and cross hatch values and good stone-chip resistance and that also the remaining technical properties, such as, for example, gloss and overcoating characteristics would be comparable to the properties obtainable by using conventional solvent-containing basecoat compositions. A further advantage is that even at low baking temperatures of the top and base layer good technical properties of the coatings are obtained, thus making the process according to the invention also suitable for the automotive repair coating field. A particular advantage in terms of toxicology is that the clearcoat is free of isocyanate.

In what follows, first the basecoat composition used in the process according to the invention and the topcoat used will now be illustrated in more detail. The topcoat used in the process according to the invention is known and described in the international patent application published under the number WO 88/02,010. This moisturecuring isocyanate-free topcoat contains as binder a polymer containing silyl groups, furthermore an organic solvent and customary auxiliaries and additives and a crosslinking catalyst.

The polymer containing silyl groups is obtainable by copolymerization of p$_1$) 0.1 to 40% by weight of ethylenically unsaturated silane monomers of the general formula (I)

where
R$^1$ is alkyl, aryl, acyl, aralkyl having 1 to 10 carbon atoms
R$^2$ is an organic radical having a polymerizable double bond
X is a hydrolyzable group
n is 1, 2 or 3 p$_2$) 5 to 30% by weight, preferably 8 to 25% by weight, of monomers having at least 2 polymerizable ethylenically unsaturated double bonds and p$_3$) 30 to 90% by weight of ethylenically unsaturated monomers without groups having active hydrogen, the sum of the relative weights of components p$_1$ to p$_3$ being in each case 100% by weight.

Examples of suitable silane monomers p$_1$ are the following compounds:

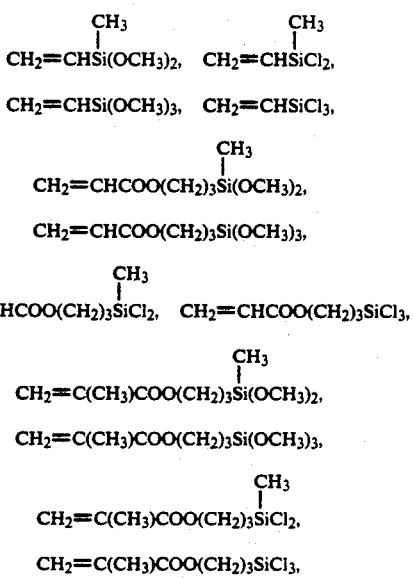

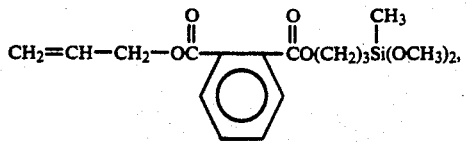

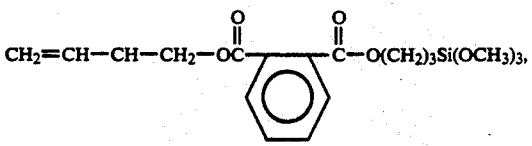

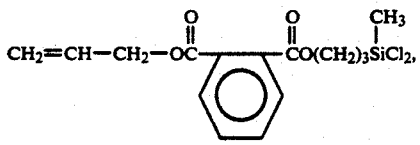

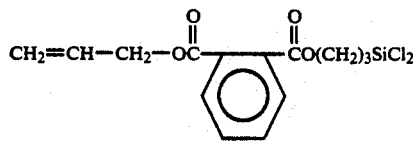

-65 -Methacryloxypropyltrimethoxysilane is particularly preferably used as component p$_1$.

As component p$_2$, it is advantageous to use compounds of the general formula

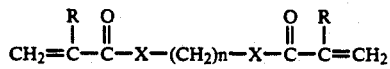

where
R is H, CH$_3$ or alkyl
X is O, NH, S
n is 2 to 8.

Examples of compounds of this type are hexanediol diacrylate, hexanediol dimethacrylate, glycol diacrylate, glycol dimethacrylate, butanediol diacrylate, butanediol dimethacrylate, trimethylolpropane triacrylate and trimethylolpropane trimethacrylate. Furthermore, divinylbenzene is also suitable as component p$_2$. It is of course also possible to use combinations of these polyunsaturated monomers.

Furthermore, component p$_2$ can advantageously be a polycarboxylic acid esterified with an unsaturated alcohol containing a polymerizable double bond or an unsaturated monocarboxylic acid esterified with an unsaturated alcohol containing a polymerizable double bond.

Furthermore, as component p$_2$, a reaction product of a polyisocyanate with an unsaturated alcohol or an amine can advantageously be used. One example is the reaction product of one mol of hexamethylene diisocyanate and two mol of allyl alcohol or the reaction product of isophorone diisocyanate and hydroxyethyl acrylate. A further advantageous component p$_2$ is a diester of polyethylene glycol and/or polypropylene glycol having an average molecular weight of less than 1500, preferably less than 1000, and acrylic acid and/or methacrylic acid.

Suitable components p$_2$ are furthermore reaction products of a carboxylic acid having a polymerizable olefinically unsaturated double bond with glycidyl acrylate and/or glycidyl methacrylate and reaction products of dicarboxylic acids with glycidyl acrylate and/or glycidyl methacrylate. However, ethylenically polyunsaturated monomers of this type should be used according to the invention only in small proportions, since they contain hydroxyl groups which are capable of reacting with the silane monomers $p_1$. This is also true of ethylenically polyunsaturated monomers formed from diepoxy compounds and ethylenically unsaturated monomers having a primary or secondary amino group, since these products also contain hydroxyl groups.

The selection of the ethylenically unsaturated neutral monomers (component $p_3$) is not particularly critical. They can be selected from the group comprising styrene, vinyltoluene, alkyl esters of acrylic acid and of methacrylic acid, alkoxyethyl acrylate and aryloxyethyl acrylate and the corresponding methacrylates and esters of maleic and fumaric acid. Examples of these are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, 3,5,5-trimethylhexyl methacrylate, decyl methacrylate, dodecyl methacrylate, hexadecyl methacrylate, octadecyl methacrylate, butoxyethyl acrylate, butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride and phenoxyethyl acrylate. Further monomers can be used as long as they do not lead to undesirable properties of the copolymers.

To enable more rapid water absorption during the cross-linking under the effect of humidity, it is particularly advantageous to use as comonomer $p_4$, in addition to the ethylenically unsaturated monomers $p_1$, $p_2$ and $p_3$, up to 10% by weight, relative to the sum of $p_1$ to $p_4$, of an ethylenically unsaturated carboxamide.

Examples of suitable components $p_4$ are acrylamide, methacrylamide, itaconamide, α-ethylacrylamide, crotonamide, fumaramide and maleamide.

If desired, up to 5% by weight of ethylenically unsaturated monomers having a hydroxyl group, a carboxyl group or an amino group can also be used (component $p_5$). Examples of hydroxyl-containing ethylenically unsaturated monomers are hydroxyalkyl esters of acrylic acid and/or methacrylic acid, for example hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Component $p_5$ can also be a reaction product of 1 mol of hydroxyethyl acrylate and/or hydroxyethyl methacrylate and on average 2 mol of ε-caprolactone. Component $p_5$ can also be a hydroxyl-containing ester of acrylic acid or metharcylic [sic] acid having a secondary hydroxyl group, such as, for example, 2-hydroxypropyl acrylate, 2-hydroxybutyl acrylate, 3-hydroxybutyl acrylate and the corresponding methacrylates. A suitable hydroxyl-containing polymerizable monomer is also a reaction product of acrylic acid and/or methacrylic acid with the glycidylester of a carboxylic acid having a tertiary α-carbon atom. Examples of ethylenically unsaturated monomers having a carboxyl group are methacrylic acid and acrylic acid. A suitable ethylenically unsaturated monomer having an amino group is N-tert.-butylaminoethyl acrylate.

The free-radical polymerization for preparing the polymers containing silyl groups is carried out in an organic solvent at temperatures of 80°–130° C., preferably at 90°–120° C. The free-radical polymerization for preparing the polymer containing silyl groups is advantageously carried out in such a manner that a solution of the polymer having a solids content of 40–65% by weight is obtained.

Suitable solvents for the free-radical polymerization are nonreactive solvents, such as, for example, esters, ethers, hydrocarbons, alcohols and ketones.

The polymerization reaction is carried out in the presence of an initiator in the presence of at least 2% by weight, preferably of at least 4% by weight, in each case relative to the total weight of monomers $p_1$ to $p_5$, of a polymerization regulator without active OH or NH groups, mercaptosilanes being preferably used as regulator. Examples of suitable regulators are the compounds described in the international patent application published under the number WO 88/02,010.

It is found that frequently only certain regulators are suitable for certain combinations of the monomers $p_1$ to $p_5$ to be polymerized.

If, for example, diacrylates or dimethacrylates of the general formula

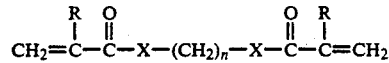

where
R is H, $CH_3$ or alkyl
X is O NH, S
n is 2 to 8, are polymerized as component $p_2$ in an amount of more than 10% by weight, relative to the overall weight of all monomers, the polymerization should be carried out using more than 6% by weight, relative to the overall weight of the monomers, of mercaptoethyltriethoxysilane and/or mercaptopropylmethyldimethoxysilane, if appropriate together with other mercapto compounds, in a temperature range between 100° C. and 120° C.

In the abovementioned ethylenically polyunsaturated acrylate and methacrylate compounds are copolymerized in an amount of at least 15% by weight, relative to the weight of the monomers, acrylate monomers and/or methacrylate monomers and/or maleic and/or fumaric esters should be used as monomers without groups having active hydrogen (component $p_3$). The copolymerization should be carried out in the presence of more than 6% by weight, relative to the weight of monomers, of a mercaptosilane, preferably mercaptoethyltriethoxysilane or mercaptopropylmethyldimethoxysilane, if appropriate together with other mercapto compounds.

If more than 10% by weight of divinyl aromatics, such as, for example, divinylbenzene, are copolymerized as component $p_2$ together with monomers $p_1$, $p_3$ and if appropriate $p_4$ and if appropriate $p_5$, more than 10% by weight, relative to the weight of monomers, of mercaptoethyltriethoxysilane and/or mercaptopropylmethyldimethoxysilane should be preferably used as regulator to prevent gelling of the copolymer.

Suitable initiators are preferably azo initiators, such as, for example, azobis(isobutyronitrile). If the proportion of ethylenically unsaturated monomer (component $p_2$) used is low, peroxy esters can also be used as initiators. An example of these is tert.-butyl peroxy-2-ethylhexanoate. It is of course also possible to use azo initiators having reactive silicone groups. These are used in a proportion of 0.01 to 20 parts by weight per 100 parts by weight of the polymerizable monomers.

Examples of usable azo initiators containing reactive silicone groups can be found in EP-A 159,715 and EP-A 159,716.

The topcoats usually contain this polymer containing silyl groups in amounts of 20 to 85% by weight, preferably 35 to 70% by weight, in each case relative to the overall weight of the topcoat. Apart from 15 to 80% by weight, preferably 30 to 65% by weight, relative to the overall weight of the topcoat of one or more organic solvents, the topcoats additionally contain per 100 parts by weight of the polymer 0.01 to 20 parts by weight of a crosslinking catalyst which is added only a short time before applying the topcoat. Examples of suitable crosslinking catalysts are phosphoric acid, p-toluenesulfonic acid, dibutyltin dilaurate, dioctyltin dilaurate, amines, for example aliphatic diamines, such as ethylenediamine, hexanediamine, aliphatic polyamines, such as diethylenetriamine,triethylenetetramine, tetraethylenepentamine, alicyclic amines, such as piperidine, piperazine, aromatic amines, ethanolamine, triethylamine, diazabicyclooctane, amidines, such as diazabicycloalkenes, for example diazabicyclononene, diazabicycloundecene and low-molecular-weight basic siloxanes having at least one hydrolyzable group, such as, for example, 3-aminopropyltriethoxysilane, 3-aminopropyltrimethoxysilane, 3-aminopropyltris(methoxyethoxythoxy)silane, 3-aminopropylmethyldiethoxysilane, N-2-aminoethyl-3-aminopropyltrimethoxysilane, methoxysilane, N-2-aminoethyl-3-aminopropylmethyldimethoxysilane,N-methyl-3-aminopropyltrimethoxysilane,3-ureidopropyltriethoxysilane and 4,5-dihydroimidazol-1-ylpropyltriethoxysilane; preferably 4,5-dihydroimidazol-1-ylpropyltriethoxysilane, furthermore alkali catalysts, such as, for example, potassium hydroxide or sodium hydroxide. Advantageously, 0.01 to 10 parts by weight of the catalyst per 100 parts by weight of the polymer are used.

Further suitable tin compounds which can be used as crosslinking catalysts are compounds having tin-sulfur single or double bonds, such as, for example
(n-C$_4$H$_9$)$_2$ Sn(SCH$_2$ COO),
(n-C$_8$H$_{17}$)$_2$ Sn(SCH$_2$CH$_2$COO),
(n-C$_8$H$_{17}$)$_2$ Sn(SCH$_2$COO CH$_2$ CH$_2$ OCO CH$_2$S),
(n-C$_8$H$_{17}$)$_2$ Sn(SCH$_2$ COO CH$_2$ CH$_2$ CH$_2$ CH$_2$OCO CH$_2$S),
(n-C$_4$H$_9$)$_2$ Sn(SCH$_2$ COO C$_8$H$_{17}$-iso)$_2$,
(n-C$_8$H,17)$_2$ Sn(SCH$_2$ COO C$_{12}$H$_{25}$-n)$_2$,
(n-C$_4$H$_9$)$_2$ Sn(SCH$_2$COO C$_8$H$_{17}$-iso)$_2$ and
(n-C$_8$H$_{17}$)$_2$ Sn=S.

Mixtures of the abovementioned tin-sulfur compounds with tin compounds, such as, for example, with dialkyltin dimaleates, are also suitable catalysts. Preference is given to mixtures of organotin compounds, such as, for example, dibutyltin dilaurate with the abovementioned low-molecular-weight basic siloxanes and/or mercapto-containing siloxanes containing at least one hydrolyzable group, such as, for example, 3-mercaptopropyltriethoxysilane, 3-mercaptopropylmethyldimethoxysilane and 3-mercaptopropyltrimethoxysilane.

Further catalysts which are also suitable can be found in EP-A 48,461 and in EP-A 63,753.

Finally, the topcoats can, if desired, additionally contain up to 8% by weight, relative to the overall weight of the topcoat, of further auxiliaries and additives, such as, for example, flow-improving agents and light stabilizers.

The topcoats are prepared by customary methods by processing the polymer containing silyl groups, the organic solvent and auxiliaries and additives by mixing and, if desired, dispersing to give a coating composition to which shortly before use a crosslinking catalyst is admixed.

Due to the low curing temperatures, the topcoats described are in particular suitable for repair coating of automobile bodies.

The aqueous basecoat compositions used in the process according to the invention are also known per se and described, for example, in German Offenlegungsschrift 3,545,618, German Offenlegungsschrift 3,739,332, U.S. Pat. No. 4,558,090, U.S. Pat. No. 4,489,135, EP-A 89,497, EP-A 38,127, German Offenlegungsschrift 3,628,124, EP-A 158,099, German Offenlegungsschrift 2,926,584, U.S. Pat. No. 4,719,132, EP-A 195,931 and German Offenlegungsschrift 3,321,180.

Preference is given to the use of aqueous basecoat compositions containing a polyurethane resin, if appropriate in combination with other water-dilutable binders, as water-dilutable binder. The water-dilutable polyurethane resin has an acid number of 5 to 70 mg of KOH/g and can be obtained by preparing an intermediate having terminal isocyanate groups from
a) diols and/or polyols
b) diisocyanates and
c) compounds containing two groups which are reactive toward NCO groups, at least some of the compounds used as component (c) having at least one group capable of anion formation which is neutralized before or after incorporating component c in the polyurethane molecule, and then reacting the free isocyanate groups of this intermediate with a polyol (d) containing at least three hydroxyl groups, preferably a triol, or a polyamine and/or hydrazine.

The preparation of the intermediate composed of components a, b and c and having terminal isocyanate groups and the reaction of this intermediate with the polyol or polyamine is carried out by well known processes of polyurethane chemistry (cf., for example, Kunststoff-Handbuch (Plastics Handbook), Volume 7: polyurethanes, edited by Dr. G. Oertel, Carl Hanser Verlag Munich-Vienna 1983). The reactions are preferably carried out at temperatures of up to 150° C., particularly preferably between 50° and 130° C., preferably in solvents which are inert toward isocyanate groups and miscible with water. Particularly suitable solvents are acetone and methyl ethyl ketone. The neutralization of the groups capable of formation anion can be carried out before, during or after the synthesis of the polyurethane resin.

The amounts of the individual components are selected in such a manner that the equivalent ratio of NCO to OH groups or other reactive groups is between 1.5:1.0 and 1.0:1.0, 1.4:1.0 and 1.2:1.0 being preferred.

In principle, any diols and/or polyols customary for the preparation of binders based on polyurethanes can be used as component a.

To increase the hardness of the polyurethane, it is possible to use low-molecular-weight polyols. They have a molecular weight of 60 to about 400 and can contain aliphatic, alicyclic or aromatic groups. Amounts of up to 30% by weight of the entire polyol components, preferably about 2 to 20% by weight, are used. Advantageous polyols are those of low molecular weight having up to about 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentylglycol, neopentylglycol hydroxypivalate, hydroxyethylated or hydroxypropylated bisphenol A, hydrogenated bisphenol A and mixtures thereof.

To obtain an NCO prepolymer of high flexibility, a high percentage of a predominantly linear polyol having a preferred hydroxyl number of 30 to 150 mg of KOH/g should be added. Up to 97% by weight of the entire polyol can be made u of saturated and unsaturated polyesters and/or polyethers having a molecular weight Mn from 400 to 5000. Suitable high-molecular-weight polyols are aliphatic polyether diols of the general formula H—(—O—(—CHR)$_n$—)$_m$—OH where R is hydrogen or a lower alkyl radical which may contain various substituents, in which n is 2 to 6, preferably 3 to 4, and m is 2 to 100, preferably 5 to 50. Examples are linear or branched polyether diols, such as poly(oxyethylene) glycols, poly(oxypropylene) glycols and/or poly(oxybutylene) glycols. The polyether diols selected should not introduce excessive amounts of ether groups, since otherwise the polymers formed swell in water. The preferred polyether diols are poly(oxypropylene) glycols in the molecular weight range Mn from 400 to 3000. Polyester diols are prepared by esterification of organic dicarboxylic acids or their anhydrides with organic diols or are derived from a hydroxycarboxylic acid or a lactone. To prepare branched polyester polyols, it is possible to use a small amount of polyols or polycarboxylic acids having a higher functionality. The dicarboxylic acids and diols can be linear or branched aliphatic, cycloaliphatic or aromatic dicarboxylic acids or diols.

The diols used for the preparation of the polyesters are composed, for example, of alkylene glycols, such as ethylene glycol, propylene glycol, butylene glycol, 1,4-butanediol, 1,6-hexanediol, neopentylglycol and other diols, dimethylolcyclohexane. The acid component of the polyester primarily consists of low-molecular-weight dicarboxylic acids or their anhydrides having 2 to 30, preferably 4 to 18, carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids, their anhydrides if they exist can also be used.

When the polyester polyols are formed, it is also possible for small amounts of carboxylic acids having 3 or more carboxyl groups, for example trimellitic anhydride or the adduct of maleic anhydride with unsaturated fatty acids, to be present.

The polyester polyols usable as component a can be prepared by generally known methods by esterifying organic dicarboxylic acids or their anhydrides with organic diols. In this reaction, acid and/or hydroxyl components with functionalities greater than 2 can also be used.

It is possible to use polyester diols derived from lactones as component a. These products are obtained, for example, by reacting ε-caprolactone with a diol. Products of this type are described in U.S. Pat. No. 3,169,945.

Very particularly preferred polyurethane resin binders are obtained by using as component a polyester polyols whose acid component consists at least in part of dimeric fatty acids. Binders of this type are described in U.S. Pat. No. 4,423,179.

Any desired organic diisocyanates can be used as component b for preparing the polyurethane dispersion. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-diphenylene diisocyanate, 1,6-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane.

The compounds used as component c preferably contain hydroxyl groups as groups reacting with isocyanate groups. It is also possible to use amino-containing compounds. However, these compounds can have an adverse effect on the application properties of the coating composition. The type and amount of the amino-containing compounds, if used, have to be determined by the average person skilled in the art by routine experiments which are simple to carry out.

Suitable groups which are capable of anion formation are in particular carboxyl and sulfo groups.

Examples of compounds containing at least two groups reacting with isocyanate groups and at least one group capable of anion formation are dihydroxypropionic acid, dimethylolpropionic acid, dihydroxysuccinic acid or dihydroxybenzoic acid.

To neutralize the anionic groups, tertiary amines which do not have any groups reacting with isocyanate groups are preferably used. Examples are trimethylamine, triethylamine, dimethylaniline, N-ethylmorpholine, diethylaniline, triphenylamine and the like. For example, low-molecular-weight diols or diamines having primary or secondary amino groups can be used as compounds having two groups which are reactive toward isocyanate groups but are free of groups capable of anion formation.

The reaction of the intermediate formed from a, b and c and containing isocyanate groups with a polyol a containing at least three hydroxyl groups is preferably controlled by the stoichiometry of the compounds used in such a manner that the chain-lengthening and if desired, also branching of the binder molecules take place. In this reaction, extreme care must be taken that no cross-linked products are obtained (cf., for example, U.S. Pat. No. 4,423,179).

Examples of polyols d containing at least three hydroxyl groups are trimethylolpropane, glycerol, erythritol, mesoerythritol, arabitol, adonitol and the like. Trimethylolpropane is preferably used.

The product obtained from components a, b, c and d can, after neutralization of the groups capable of anion formation, be transferred to an aqueous phase. The binder dispersion thus obtained can then be incorporated in the water-dilutable basecoat compositions used according to the invention.

Very particularly preferred water-dilutable basecoat compositions are obtained by using the water-dilutable polyurethanes disclosed in U.S. Pat. No. 4,423,179 as binders.

In many cases, it is desirable to improve selectively the properties of the coatings obtained by the additional use of further binder systems.

The basecoat compositions used according to the invention and containing polyurethane resins advantageously contain a water-dilutable melamine resin in an amount of 1 to 89% by weight, preferably 30 to 70% by weight, relative to the amount of the water-dilutable polyurethane resin, as additional binder component.

Water-dilutable melamine resins are known per se and are used to a very large extent. They are in general etherified melamine/formaldehyde condensation products. Their water solubility depends—apart from the degree of condensation which should be as low as possible—on the etherifying component, of which only the lowest members of the alkanol and ethylene glycol monoether series lead to water-soluble condensation products. The melamine resins etherified with methanol have the greatest importance. If solubilizing agents are used, it is also possible to disperse melamine resins etherified with butanol in the aqueous phase.

There is also the possibility of incorporating carboxyl groups in the condensation products. Transetherification products of highly etherified formaldehyde condensation products with oxycarboxylic acids are water-soluble after neutralization via their carboxyl group and can be present in the basecoat compositions used according to the invention.

Instead of the melamine resins described, it is also possible to use other water-soluble or water-dispersible amino resins, such as, for example, urea resins.

If the basecoat composition contains a melamine resin, it can advantageously additionally contain, as further binder component, a water-dilutable polyester resin and/or a water-dilutable polyacrylate resin, the weight ratio of melamine resin to polyester/polyacrylate resin being 2:1 to 1:4 and the weight ratio of melamine resin plus polyester and/or polyacrylate resin to polyurethane resin 4:1 to 1:4, preferably 2:1 to 1:2, particularly preferably 1.3:1 to 1:1.3.

Polyester resins carrying hydroxyl groups are preferably used as water-dilutable polyester resins. The polyester resins used according to the invention preferably contain carboxylate groups as solubilizing groups.

Water-dilutable polyester resins of the type described above are known per se and can be prepared by reacting polyhydric polyols with polycarboxylic acids or polycarboxylic anhydrides.

Polyester resins having an average functionality per molecule of 2.5 to 10 and having an average degree of condensation per molecule of 10 to 25 are preferably used. The degree of condensation is the sum of monomer building blocks in the chain of the polymer molecule.

The polyester resins used preferably have a maximum acid number of 30 and a maximum hydroxyl number of 150.

Acid components which are preferred for the synthesis of the polyester resins are aliphatic, cycloaliphatic saturated or unsaturated and/or aromatic polybasic carboxylic acids, preferably di-, tri- and tetracarboxylic acids, having 2 to 14, preferably 4 to 12, carbon atoms per molecule, or esterifiable derivatives thereof (for example anhydrides or esters), for example phthalic anhydride, isophthalic acid, terephthalic acid, tetrahydro- and hexahydrophthalic anhydride, endomethylenetetrahydrophthalic acid, succinic acid, glutaric acid, sebacic acid, azelaic acid, trimellitic acid and trimellitic anhydride, pyromellitic anhydride, fumaric acid and maleic acid. Phthalic anhydride is the most common acid component. The polyester resins should not contain more than 20 mol % of fumaric and maleic acid radicals, relative to the polycarboxylic acid radicals introduced by condensation.

Polyols which are preferred for the synthesis of the polyesters are aliphatic, cycloaliphatic and/or araliphatic alcohols having 1 to 15, preferably 2 to 6, carbon atoms, and 1 to 6, preferably 1 to 4, OH groups per molecule bound to non-aromatic carbon atoms, for example glycols, such as ethylene glycol, 1,2- and 1,3-propanediol, 1,2-, 1,3- and 1,4-butanediol, 2-ethyl-1,3-propanediol, 2-ethyl-1,3-hexanediol, neopentylglycol, 2,2-trimethyl-1,3-pentanediol, 1,6-hexanediol, 1,2- and 1,4-cyclohexanediol, 1,2- and 1,4-bis(hydroxymethyl)-cyclohexane, di(ethylene glycol) adipate; ether alcohols, such as di- and triethylene glycol, dipropylene glycol; dimethylolpropionic acid, alkoxylated bisphenols having two $C_2$-$C_3$-hydroxyalkyl groups per molecule, perhydrogenated bisphenol; 1,2,4-butanetriol, 1,2,6-hexanetriol, trimethylolethane, trimethylolpropane, trimethylolhexane, glycerol, pentaerythritol, dipentaerythritol, mannitol and sorbitol; chain-terminating monohydric alcohols having 1 to 8 carbon atoms, such as propanol, butanol, cyclohexanol and benzyl alcohol, hydroxypivalic acid. The most common alcohols are glycerol, trimethylolpropane, neopentylglycol and pentaerythritol.

The polyester resins usable according to the invention can also be modified with monocarboxylic acid and monoalcohols.

Examples of monocarboxylic acids are benzoic acid, p-tert.-butylbenzoic acid, hexahydrobenzoic acid and abietic acid.

Examples of monoalcohols are methanol, propanol, cyclohexanol, 2-ethylhexanol and benzyl alcohol.

It is also possible to replace up to 25% of the ester bonds by urethane bonds.

Preferred polyacrylate resins are obtained by copolymerization of vinyl or vinylidene monomers, such as, for example, styrene, α-methylstyrene, o- or p-chlorostyrene, o-, m- or p-methylstyrene, p-tert.-butylstyrene, (meth)acrylic acid, (meth)acrylonitrile, alkyl acrylates and methacrylates having 1 to 8 carbon atoms in the alkyl component, for example ethyl acrylate, methyl acrylate, n- or iso-propyl acrylate, n-butyl acrylate, 2-ethylhexyl acrylate, 2-ethylhexyl methacrylate, isooctyl acrylate, tert.-butyl acrylate, methyl methacrylate, ethyl methacrylate, n- or iso-propyl methacrylate, butyl methacrylate, isooctyl methacrylate and if desired, mixtures thereof; hydroxyalkyl (meth)acrylates having 2 to 4 carbon atoms in the alkyl group, for example 2-hydroxyethyl (meth)acrylate, 2-hydroxypropyl (meth)acrylate, 4-hydroxybutyl (meth)acrylate; trimethylolpropane mono(meth)acrylate, pentaerythritol mono(meth)acrylate and esters thereof with fatty acids, diesters of fumaric acid, itaconic acid, maleic acid having 4 to 8 carbon atoms in the alcohol component; acrylonitrile, (meth)acrylamide, vinyl esters of alkanemonocarboxylic acids having 2 to 5 carbon atoms, such as vinyl acetate or vinyl propionate or mixtures of the monomers mentioned, and N-methoxymethyl (meth)acrylamide.

Preferred monomers are styrene and alkyl (meth)acrylates having 1 to 8 carbon atoms in the alcohol component, the esterification product of fatty acid with hydroxyalkyl acrylates and mixtures thereof.

Linear or branched hydroxyl-containing polyethers are preferably used as water-dilutable polyethers. Examples are poly(oxypropylene) glycols having an average molecular weight of 400 to 1000, preferably 600 to 900.

Blocked polyisocyanates can be used as crosslinking agents.

The basecoat compositions used in the process according to the invention contain 5 to 30% by weight, preferably 10 to 25% by weight, of water-dilutable binder components.

PIGMENTS

The basecoat compositions used according to the invention contain metallic pigments, preferably aluminum flake pigments which, as described in German Offenlegungsschrift 3,636,183, can also be pretreated.

The aluminum flake pigments can also be used together with color pigments. In this case, the type and amount of color pigments is selected such that the desired metallic effect is not suppressed.

It is also possible to use mica flakes coated with metal oxides as special-effect pigments in combination with aluminum flake pigments.

The pigment content of the basecoat compositions used according to the invention is—relative to the solids content of the entire binder—in general up to 25% by weight, preferably 12 to 18% by weight.

AUXILIARIES AND ADDITIVES

The basecoat compositions used according to the invention usually contain 2 to 10% by weight, relative to the entire solids content, of one or more thickeners.

Layer silicates, in particular sodium magnesium silicate compounds of the montmorillonite type are often used as thickener (cf., for example, H. Kittel, Lehrbuch der Beschichtungen (Textbook of Coatings), Volume II, page 340 and Volume III, pages 272-274; Verlag W. A. Colomb 1974, 1976). Furthermore, water-soluble cellulose ethers, such as hydroxyethylcellulose, methylcellulose, carboxymethylcellulose and synthetic polymers having ionic groups and/or groups which form associations, such as polyvinyl alcohol, poly(meth)acrylamide, poly(meth)acrylic acid, polyvinylpyrrolidone, styrene/maleic anhydride or ethylene/maleic anhydride copolymers and derivatives thereof or even hydrophobically modified ethoxylated urethanes or polyacrylates act as thickeners. Likewise, polymer microparticles can also be used as is disclosed, for example, in EP-A 38,127.

The basecoat compositions according to the invention can also contain further customary additives, such as fillers, auxiliaries, plasticizers, stabilizers, wetting agents, dispersing aids, flow-improving agents, antifoams and catalysts individually or in a mixture in the customary amounts, preferably 0 to 25% by weight, relative to the total weight of the basecoat composition.

Examples of suitable fillers are talc, mica, kaolin, chalk, quartz powder, asbestos powder, slate powder, barium sulfate, various silicas, silicates, glass fibers, organic fibers and the like.

The basecoat compositions are prepared as follows:

If the basecoat composition contains a water-dilutable polyurethane resin as water-dilutable binder, a finely divided aqueous polyurethane dispersion is first prepared from the abovementioned components a, b, c and d. The components are reacted with one another by the well-known processes of organic chemistry (see above). First the polyether diol or polyester diol, the diisocyanate and the components c which are bifunctional toward isocyanate groups are reacted with one another in organic solvents, after previous neutralization with a tertiary amine of the groups of component c which are capable of anion formation. In the reaction, first components a and b can be reacted and then the further reaction with c can be carried out, or the components mentioned can be reacted simultaneously. The product obtained is then transferred into an at least predominantly aqueous phase, and the reaction of any still present isocyanate groups with a polyol d containing at least three hydroxyl groups, preferably a triol or amine, is carried out. The pH of the resulting polyurethane dispersion is then adjusted to a value between 6 and 9.

If other water-dilutable binders are used for the basecoat composition, an aqueous dispersion of the particular resin is also first prepared.

The remaining components, such as, for example, additional binders, aluminum flake pigments, if desired color pigments, organic solvents, thickeners and other auxiliary are then homogeneously incorporated in this binder dispersion, for example, by means of a stirrer or dissolver. Finally the pH is checked again and, if necessary, adjusted to a value of 6 to 9, preferably 7.0 to 8.5, by adding an amine, such as, for example, triethylamine, dimethylethanolamine and N-ethylmorpholine. Furthermore, the solids content and the viscosity are adjusted to the values adapted to the particular application conditions. The ready-to-use coating agents as a rule have a solids content of 10 to 30% by weight. Their water content is 60 to 90% by weight, and that of organic solvents 0 to 20% by weight, in each case relative to the entire coating agent.

After the basecoat composition has been applied, it is, preferably after a short flashoff time without a baking step, overcoated with the transparent topcoat composition described above. The base layer is then baked together with the top layer (wet-in-wet process). This curing of the base layer and top layer is usually carried out at a temperature below 100° C., preferably below 80° C., in the case of automotive repair coatings. Otherwise, the curing is usually carried out at a temperature between 100° and 150° C. and over a period between 15 and 30 minutes. Suitable substrates to be coated are in particular pretreated metal substrates; however, it is also possible to coat non-pretreated metals and any other substrates, such as, for example, wood, plastics and the like with the basecoat/clearcoat coating. The dry film thicknesses of the resulting base layer are in general between 8 and 20 $\mu$m, and those of the top layer usually between 20 and 60 $\mu$m.

The invention is illustrated in more detail in the examples which follow. All parts and percentages given are by weight, unless expressly stated otherwise.

1. PREPARATION OF A COPOLYMER CONTAINING SILYL GROUPS

In the examples which follow, the solids contents were determined in a through-circulation oven after 2 hours at 100° C. The viscosities were determined by an ICI plate and cone viscometer at 23° C.

The amount of the individual monomers, the amount of solvents, the amount of initiator and regulator and the polymerization temperature and binder data can be seen from Table 1. The acrylates were prepared in standard equipment (2 liter glass reactors) equipped with stirrer, reflux condenser and feed inlets. A 1:1 mixture of xylene and 1-methoxypropyl 2-acetate was used as solvent. The solvent mixture was initially introduced, and a portion was used for dissolving the initiator. Azobis(isovaleronitrile) was used as initiator. 3-Mercaptopropylmethyldimethoxysilane was used as polymerization regulator.

The solvent mixture was heated to the stated polymerization temperature, and the temperature was maintained during the entire polymerization period. The mixture of monomers given (including the regulator) and the initiator solution were metered in separately.

The addition periods for the monomer mixture (including the regulator) were 3 hours and for the initiator solution 3.5 hours, both additions being started at the same time; the addition took place evenly over the period given, and after the addition of the initiator was complete the polymerization was continued for another 2 hours at the stated polymerization temperature. The amounts of monomers, solvents etc. are given in pbw=parts by weight.

TABLE 1

| Example No. 1 | |
| --- | --- |
| Initially introduced silvent[1)] | 1,002 pbw |
| γ-Methacryloxypropyltrimethoxysilane | 300 pbw |
| Hexanediol diacrylate | 200 pbw |
| Methyl methacrylate | 200 pbw |
| Tert.-Butyl acrylate | 100 pbw |
| n-Butyl acrylate | 100 pbw |
| Cyclohexyl methacrylate | 100 pbw |
| Regulator[2)] | 80 pbw |
| Initiator[3)] | 26 pbw |
| Solvent for init.[1)] | 104 pbw |
| Polymerization temp. | 110° C. |
| Solids content | 49% |
| Visc. (dPa × s) | 2 |
| $\overline{M}_n$[4)] | 3,000 |
| $\overline{M}_w$ | 65,000 |

[1)] 1:1 mixture of xylene and methoxypropyl acetate
[2)] 3-mercaptopropylmethyldimethoxysilane
[3)] azobis(isovaleronitrile)
[4)] The average molecular weights were determined by gel permeation chromatography against a polystyrene standard

2. PREPARATION OF A CLEARCOAT 76.0 parts of the copolymer described above and containing silyl groups, 4.0 parts of a 0.006% strength solution of a polysiloxane polyether in Solvesso ® 100, 8.0 parts of butylglycol acetate, 1.0 part of a commercially available light stabilizer (commercial product "Tinuvin 292" from Ciba Geigy), 1.0 part of a further commercially available light stabilizer (commercial product "Tinuvin 1130" from Ciba Geigy), 5.0 parts of butanol and 5 parts of butyl acetate are used to prepare a clearcoat by stirring the individual components successively by means of a dissolver. 8.0 parts of a sealing mixture comprising 50% by weight of butyl acetate, 10% by weight of benzine having a boiling range of 135° to 180° C., 15% by weight of xylene, 15% by weight of Solvent Naphta ®, 5% by weight of methoxypropyl acetate and 5% by weight of butylglycol acetate are then added. 3 parts of a 10% strength solution of dibutyltin dilaurate in butanol, 1.5 parts of 4,5-dihydro-1-[3-(triethoxysilyl)propyl]-imidazole and 10 parts of a 1% strength solution of γ-mercaptopropyltrimethoxysilane in xylene are used as catalysts.

3. PREPARATION OF A WATER-DILUTABLE BASECOAT COMPOSITION

To prepare a polyurethane dispersion, first 570 g of a commercially available polyester prepared from caprolactone and a glycol and having a hydroxyl number of 196 were dehydrated at 100° C. in vacuo for 1 hour. 524 g of 4,4'-dicyclohexylmethane diisocyanate were added at 80° C. and stirred at 90° C. until the isocyanate content is 7.52% by weight, relative to the total weight. After cooling to 60° C., a solution of 67 g of dimethylolpropionic acid and 50 g of triethylamine in 400 g of N-methylpyrrolidone is added, and the mixture is stirred at 90° C. for 1 hour. The composition obtained is added to 1840 g of cold deionized water with vigorous stirring. 86 g of a 15% strength hydrazine solution are added to the dispersion obtained over a period of 20 minutes with vigorous stirring. The resulting, very finely divided dispersion has a solids content of 35% and a flow time of 27 seconds in the DIN 4 cup.

The water-soluble polyester used is prepared as follows:

832 parts by weight of neopentylglycol are weighed into a reactor equipped with a stirrer, a thermometer and a packed column and melted. 664 parts by weight of isophthalic acid are added. The mixture is heated with stirring in such a manner that the column head temperature does not exceed 100° C. The esterification is carried out at a maximum temperature of 220° C. until an acid number of 8.5 is reached. After cooling to 180° C., 384 parts by weight of trimellitic anhydride are added, and the esterification is continued until an acid number of 39 is reached. The mixture is diluted with 425 parts by weight of butanol.

The water-dilutable basecoat composition is prepared by adding 30 parts of the polyurethane dispersion described above and having a solids content of 35% to 35 parts of thickener (paste of a sodium magnesium silicate having a layer structure, 3% strength solution in water) with stirring. 5 parts of the polyester described above (solids content 80%), 0.5 part of dimethylethanolamine, 5 parts of a commercially available melamine/formaldehyde resin esterified with methanol (solids content 70% in water), 5 parts of a commercially available aluminum pigment paste (65% strength in water, average particle diameter 10 μm), 8 parts of butylglycol and 11.5 parts of deionized water are added with further stirring. After stirring for 30 minutes, the viscosity is adjusted to a flow time of 14-15 s in the DIN 4 cup with water.

EXAMPLE 1

First phosphated steel sheets (Bonder 132) were coated with the water-dilutable basecoat composition described above (dry film thickness 18 μm). After a short flashoff time of 35 minutes, the clearcoat described above was applied (dry film thickness 50 μm). After a short flashoff time of 10 minutes, the topcoat was then dried together with the basecoat under various conditions. Some coatings were dried by storing the sheets at room temperature over a period of 4 hours, while others were dried by storage at 130° C. for 30 minutes followed by storage of the sheets at room temperature. The technical properties of the resulting coatings were then tested. The results are shown in Table 2. Furthermore, the storage time of the coated sheets at room temperature without heating, following the coating, after which the coatings are dust-dry and tack-free was determined. The results of these tests are also shown in Table 2.

COMPARATIVE EXAMPLE 1

For comparison, the clearcoat was applied, as described in the patent application published under the international number WO 88/02,010, to a conventional solvent-containing basecoat. The basecoats used were known, customary, conventional basecoats based on 15 to 25% by weight of binder, 0.5 to 22% by weight of pigments (including metallic- and special-effect pigments) and 68 to 82% by weight of solvents, the binder being a mixture of 20 to 30% by weight of CAB (35 to 40% by weight of butyryl and 0.8 to 1.8% by weight of hydroxyl groups, viscosity 50–5000 mPas), 45 to 60% by weight of polyester, 7 to 20% by weight of melamine resin and 5 to 10% by weight of polyethylene or copolymerized polyethylene wax having a melting point of 90° to 120° C., and the solvent being a mixture of 50 to 65% by weight of butyl acetate, 15 to 30% by weight of xylene, 5 to 10% by weight of butylglycol acetate and 5 to 15% by weight of butanol, and the sum of the relative amounts by weight of the binder components and the sum of the relative amounts by weight of the solvent components being in each case 100% by weight. The polyester has been synthesized from phthalic acid, adipic acid, neopentylglycol and trimethylolpropane and has an acid number (solid) of 5 to 20 mg of KOH/g, an OH number (solid) of 130 to 170 mg of KOH/g and a number average molecular weight of 1200–2500. A melamine/formaldehyde resin etherified with isobutyl alcohol and having a viscosity of 200–2000 mPas (23° C., 55% strength solution) was used as the melamine resin. These solvent-containing basecoats were applied to give a dry film thickness of 16 μm and, after a short flashoff time of 15 minutes, overcoated with the clearcoat described above (dry film thickness 45 μm). After a short flashoff time of 20 minutes, the top layer was then dried together with the base layer analogously to Example 1 under various conditions, and the resulting coating was tested analogously to Example 1. The results are listed in Table 2.

TABLE 2

Property profile of the coatings

| | Example 1 | Comparative Example 1 |
|---|---|---|
| Tack-free after | <3 h | <3 h |
| Dust-dry after | <2 h | <2 h |
| Gloss (20°) after 2 days | 83 | 85 |
| DOI[1] after 2 days | 75 | 77 |
| Erichsen cup indentation (mm) DIN 53156 (iso 1520) after 7 days | 7 | 4 |
| Stone-chip resistance[2] after 7 days | 4 | 6 |
| Cross hatch after 7 days (iso 2409) | Gt 0-1 | Gt 4 |
| Gasoline test after 2 days[3] | 3/3 | 3/3 |

[1] Determined according to procedure 6/77 in Manual Hunterlab D47R6F Dorigon, Reston Virginia, USA, of Hunter Associates Laboratory Inc.
[2] Determined by VW test procedure 3.14.3 by bombarding the coated steel sheets with 2 × 500 g of steel shot, pressure 3 bar followed by visual evaluation of the amount of chipping on a scale of 0 to 10, with 0 representing no visible damage and 10 representing total removal of coating in the test area.
[3] Felt disks (diameter 5 cm) soaked in commercially available gasoline are left covered on the film for 5 minutes. The marking (3 = no marking; 0 = substantial marking) and the softening of the film (3 = no softening; 0 = substantial softening) are rated.

We claim:

1. A process for the preparation of a multilayer protective and/or decorative coating on a substrate surface comprising the steps of:
   1. a water-dilutable basecoat composition is applied, which composition comprises
      a) at least one water-dilutable binder,
      b) metallic pigments and, if desired, color pigments and, if desired, fillers,
      c) if desired, customary auxiliaries and additives and
      d) up to 20% by weight of organic solvents,
   2. a polymer film is formed on the surface from the composition applied in step (1),
   3. a transparent topcoat is applied to the base layer thus obtained, which topcoat contains a polymer containing silyl groups, the polymer being obtained by copolymerization of
      p1) 0.1 to 40% by weight of ethylenically unsaturated silane monomers of the general formula (I)

where
R$^1$ is alkyl, aryl, acyl, aralkyl having 1 to 10 carbon atoms
R$^2$ is an organic radical having a polymerizable double bond,
X is a hydrolyzable group, and
n is 1, 2 or 3,
      p2) 5 to 30% by weight of monomers having at least 2 polymerizable ethylenically unsaturated double bonds, and
      p3) 30 to 90% by weight of ethylenically unsaturated monmers without groups having active hydrogen, the sum of the relative weight of components p$_1$ to p$_3$ being in each case 100% by weight, and
   4. the top layer is cured together with the base layer.

2. The process as claimed in claim 1, wherein a water-dilutable basecoat composition is applied which comprises as water-dilutable binder, a water-dilutable polyurethane resin having an acid number of 5 to 70 mg of KOH/g and being prepared by preparing an intermediate having terminal isocyanate groups from
   a) diols and/or polyols
   b) diisocyanates and
   c) compounds comprising two groups which are reactive toward isocyanate groups, at least some of the compounds used as component (c) having at least one group capable of anion formation which is neutralized before or after incorporating component c in the polyurethane molecule, and then reacting the free isocyanate groups of this intermediate with a polyol (d) comprising at least three hydroxyl groups, preferably a triol, or a polyamine and/or hydrazine.

3. The process as claimed in claim 2, wherein the basecoat composition comprises, a water-dilutable melamine resin in an amount of 1 to 80% by weight, preferably 30 to 70% by weight, relative to the amount of the water-dilutable polyurethane resin, as additional binder component.

4. The process as claimed in claim 3, wherein the basecoat composition comprises as further binder component, a water-dilutable polyester resin and/or a water-dilutable polyacrylate resin, the weight ratio of melamine resin to polyester resin and/or polyacrylate resin being 2:1 to 1:4 and the weight ratio of melamine resin plus polyester and/or polyacrylate resin to polyurethane resin being 4:1 to 1:4.

5. The process as claimed in claim 2, wherein the basecoat composition comprises, as additional binder component, a blocked polyisocyanate together with a water-dilutable polyester resin and/or a water-dilutable polyacrylate resin, and the weight ratio of polyisocyanate plus polyester and/or polyacrylate resin to polyurethane resin is 4:1 to 1:4.

6. The process as claimed in claim 1, wherein a transparent topcoat is applied containing a polymer containing silyl groups, in the preparation of which methacryloxypropyltrimethoxysilane has been used as component $p_1$.

7. The process as claimed in claim 1, wherein monomers of the general formula (II)

$$CH_2=\overset{R}{\underset{|}{C}}-\overset{O}{\underset{\|}{C}}-X-(CH_2)_n-X-\overset{O}{\underset{\|}{C}}-\overset{R}{\underset{|}{C}}=CH_2, \text{ where}$$

R is H, $CH_3$ or alkyl,
X is O, NH, S, and
n is 2 to 8, or diesters or polyethylene glycol and/or polypropylene glycol having an average molecular weight of less than 1500, and acrylic acid and/or methacrylic acid are used as component $p_2$.

8. The process as claimed in claim 1, wherein the top layer is cured together with the base layer at temperatures below 100° C.

9. An article coated with a base layer and a transparent top layer, which article has been obtained by the process as claimed in claim 1.

* * * * *